(12) United States Patent
Bax et al.

(10) Patent No.: US 7,417,835 B2
(45) Date of Patent: *Aug. 26, 2008

(54) AIRCRAFT APPLICABLE CIRCUIT IMBALANCE DETECTION AND CIRCUIT INTERRUPTER AND PACKAGING THEREOF

(75) Inventors: Ronald A. Bax, Burbank, CA (US); Rudy Rusali, Fountain Valley, CA (US); Timothy King, Woodinville, WA (US)

(73) Assignee: Hydro-Aire, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/846,962

(22) Filed: Aug. 29, 2007

(65) Prior Publication Data

US 2007/0291427 A1 Dec. 20, 2007

Related U.S. Application Data

(60) Continuation of application No. 10/860,387, filed on Jun. 3, 2004, now Pat. No. 7,362,551, which is a continuation of application No. 10/611,218, filed on Jul. 1, 2003, now Pat. No. 6,788,505, which is a division of application No. 09/954,474, filed on Sep. 14, 2001, now Pat. No. 6,618,229, which is a continuation-in-part of application No. 09/775,337, filed on Feb. 1, 2001, now Pat. No. 6,583,975.

(51) Int. Cl.
*H02H 3/00* (2006.01)
(52) U.S. Cl. .................................... 361/42
(58) Field of Classification Search .............. 361/42
See application file for complete search history.

(56) References Cited

U.S. PATENT DOCUMENTS

| 3,512,045 | A | 5/1970 | Tipton et al. |
| 3,611,038 | A | 10/1971 | Benhan |
| 3,800,121 | A | 3/1974 | Dean et al. |

(Continued)

FOREIGN PATENT DOCUMENTS

| DE | 35 04 034 | 8/1986 |

(Continued)

OTHER PUBLICATIONS

Brochure—Eaton Aerospace, "Arc Fault Circuit Interrupter", Jan. 2001, 4 pages.

(Continued)

*Primary Examiner*—Stephen W Jackson
(74) *Attorney, Agent, or Firm*—Fulwider Patton LLP

(57) ABSTRACT

The aircraft applicable current imbalance detection and circuit interrupter interrupts an electrical circuit when a current imbalance is sensed. The current imbalance detection and circuit interrupter includes a housing, power supplies, a sensor system for sensing a current imbalance at the line side of the electrical circuit, a logic controller and a power controller including a power relay having contacts capable of surviving carry-break and make-carry-break types of ground fault conditions at anticipated current levels. At power up, the device performs a test to confirm that none of the relay contacts have failed in a closed position, and to check whether a switching FET which controls the relay coil has shorted.

23 Claims, 17 Drawing Sheets

U.S. PATENT DOCUMENTS

| | | | |
|---|---|---|---|
| 4,034,267 | A | 7/1977 | Wilson |
| 4,044,395 | A | 8/1977 | Eckart |
| 4,093,977 | A | 6/1978 | Wilson |
| 4,115,829 | A | 9/1978 | Howell |
| 4,173,774 | A | 11/1979 | Hyvarinen et al. |
| 4,205,358 | A | 5/1980 | Washington |
| 4,233,639 | A | 11/1980 | Klein et al. |
| 4,271,444 | A | 6/1981 | Howell |
| 4,347,540 | A | 8/1982 | Gary et al. |
| 4,685,022 | A | 8/1987 | Nichols, III et al. |
| 4,688,134 | A | 8/1987 | Freeman et al. |
| 4,783,713 | A | 11/1988 | Chen |
| 5,017,740 | A | 5/1991 | Honkomp et al. |
| 5,019,956 | A | 5/1991 | Nakayama et al. |
| 5,047,890 | A | 9/1991 | Kessler |
| 5,241,443 | A | 8/1993 | Efantis |
| 5,309,311 | A | 5/1994 | Ballada |
| 5,334,912 | A | 8/1994 | Counts |
| 5,361,183 | A | 11/1994 | Wiese |
| 5,521,787 | A | 5/1996 | Baker et al. |
| 5,552,952 | A | 9/1996 | Kramer et al. |
| 5,584,716 | A | 12/1996 | Bergman |
| 5,745,322 | A | 4/1998 | Duffy et al. |
| 5,835,322 | A | 11/1998 | Smith et al. |
| 5,966,280 | A | 10/1999 | Cerminara et al. |
| 5,969,921 | A | 10/1999 | Wafer et al. |
| 6,002,563 | A | 12/1999 | Esakoff et al. |
| 6,091,591 | A | 7/2000 | Heinz et al. |
| 6,246,332 | B1 | 6/2001 | Hubbard |
| 6,246,556 | B1 | 6/2001 | Haun et al. |
| 6,249,230 | B1 | 6/2001 | Baldwin et al. |
| 6,266,219 | B1 | 7/2001 | MacBeth et al. |
| 6,278,381 | B1 | 8/2001 | Bogert |
| 6,278,596 | B1 | 8/2001 | Simpson |
| 6,320,731 | B1 | 11/2001 | Eaves et al. |
| 6,327,124 | B1 | 12/2001 | Fearing et al. |
| 6,437,953 | B2 | 8/2002 | DiSalvo et al. |
| 6,583,975 | B2 | 6/2003 | Bax |
| 6,721,151 | B2 | 4/2004 | Goto et al. |
| 6,784,770 | B2 | 8/2004 | Gimenez et al. |

FOREIGN PATENT DOCUMENTS

| | | |
|---|---|---|
| EP | 450153 | 10/1991 |
| EP | 905849 | 3/1999 |
| FR | 2790334 | 9/2000 |
| GB | 2318002 | 4/1998 |
| JP | 4028737 | 3/1992 |
| JP | 3062858 | 10/1999 |

OTHER PUBLICATIONS

Leach International, "Smart" Contractors, Application Notes, No. 104, Jun. 2000.

Department of Transportation, FAA Rule, "Maintenance and Inspection Requirements", May 7, 2001 pp. 1-165A.

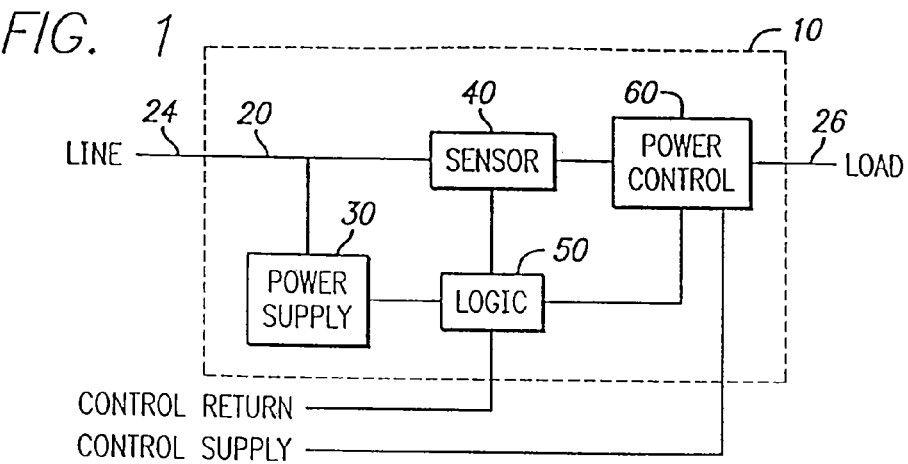
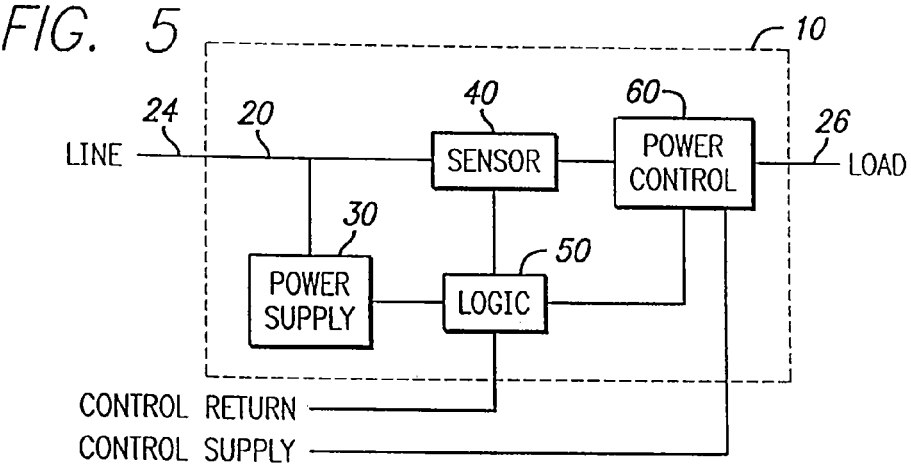
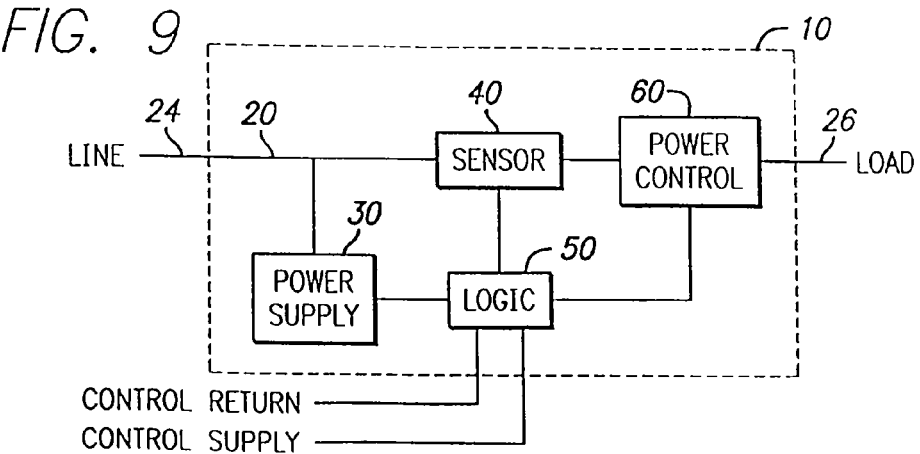

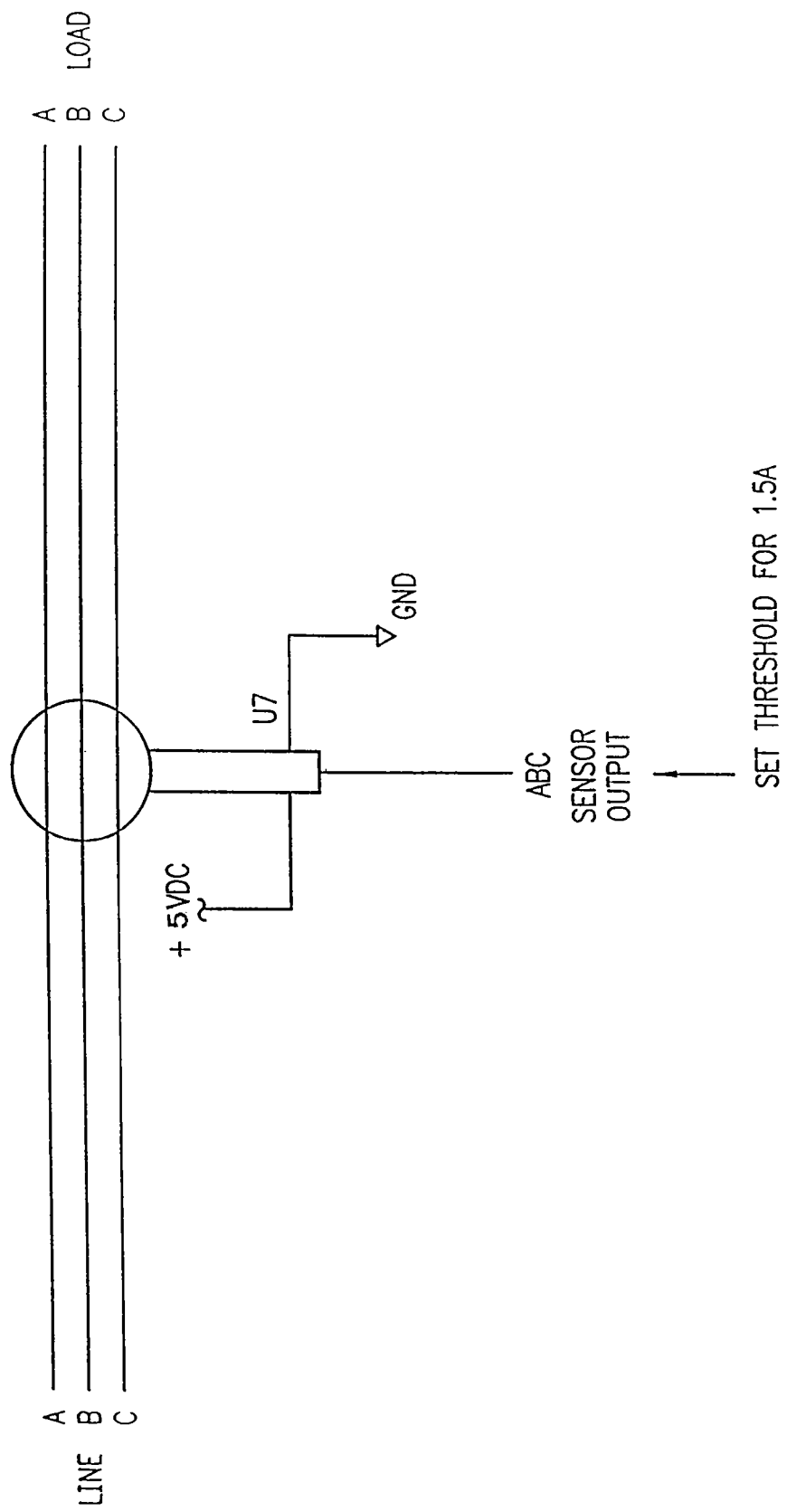

AIRCRAFT APPLICABLE CIRCUIT IMBALANCE DETECTION AND CIRCUIT INTERRUPTER AND PACKAGING THEREOF

RELATED APPLICATIONS

This is a continuation of Ser. No. 10/860,387, filed Jun. 3, 2004, which is a continuation in part of Ser. No. 10/611,218, filed Jul. 1, 2003, now U.S. Pat. No. 6,788,505, which is a divisional of Ser. No. 09/954,474, filed Sep. 14, 2001, now U.S. Pat. No. 6,618,229, which is a continuation in part of Ser. No. 09/775,337, filed Feb. 1, 2001, now U.S. Pat. No. 6,583,975.

BACKGROUND OF THE INVENTION

This invention relates generally to electrical control systems, and more specifically to an aircraft electrical control system which disconnects power to a load when a current imbalance is sensed.

In the electromechanical arts, current imbalances are indicative of serious problems that can lead to disastrous results, such as arcing within fuel pumps. Since fuel pumps are often housed within a fuel vessel to directly pump fuel out of the vessel, arcing within a fuel pump can lead to an explosion of fuel-air mixture and a subsequent breach of the fuel vessel, which can be catastrophic. In light of the seriousness of such an event, a device or methodology is needed which can suppress this type of arcing, as well as other associated problems. Presently, a common type of circuit protection device being utilized in aircraft is a thermal circuit breaker. However, arcing typically does not cause thermal circuit breakers to activate. Thus, there has been a long-felt need for the function of current imbalance detection in an aircraft. One very important form of current imbalance is a ground fault in which current is flowing between a circuit or electrical device to ground, when such current flow is not desired. In the prior art, ground fault detection has been addressed by a separate ground fault interruption unit. However, such prior art systems have had limitations, including the necessity of rewiring the aircraft. In addition to the requirement to rewire the aircraft, additional space had to be found to accommodate the ground fault interruption system.

One currently available ground fault interruption unit made by Autronics (model 2326-1) has been used in large commercial aircraft for the purpose of ground fault protection for fuel pumps. The Autronics unit detects a ground fault and outputs a signal indicative of a fault by use of a current transformer and acts by removing power to the fuel pump control relay.

Two different types of ground fault conditions can occur. The first type of ground fault condition occurs during normal ground fault interruption (GFI) operation (Control Voltage On state), in which the ground fault occurs after the relay contacts are closed, and power is being provided to the load. In relay terminology, this is known as "carry-break," i.e., the relay contacts are fully closed and carrying the current when a contact has to interrupt the fault current. Many conventional 25 Amp relays can interrupt as much as a 500 Amp current without failure. However, the second type of ground fault condition is a more severe condition for relay contacts. This second type of ground fault condition occurs when the GFI is just powered and the relay contacts close into an existing ground fault. In relay terminology, this is known as "make-carry-break," i.e., the relay contacts have just closed and the relay is immediately commanded to open and interrupt the fault current. In this second type of ground fault condition, severe arcing can occur at the relay contacts as a result of "contact bounce," in which moving contacts make and break electrical contact several times due to their inherent mass and springiness before the contacts come to rest. Unfortunately, severe arcing can occur during contact bounce in this type of ground fault condition which can also result in the welding together of the relay contacts. Tests performed with relays have shown that in this second type of ground fault condition, 25 Amp conventional relay contacts can become welded together with an arcing ground fault current as low as 150 Amps.

A need therefore exists for an improved circuit protection device for aircraft that can handle both carry-break and make-carry-break types of ground fault conditions, and fault current amplitudes, so as to insure that ground fault interruption can always be carried out without failure of the ground fault circuit interrupter. It would also be desirable to provide a ground fault circuit interrupter that at power up will perform a test to confirm that none of the relay contacts have failed in a closed position, and to check that the switching FET which controls the relay coil has not shorted.

It would further be desirable for the circuit protection device to be included within an existing device in the aircraft, or to be packaged with an existing device, sharing the same connections to existing electrical circuits, since space for avionics is limited in any aircraft and adding wiring to accommodate a new device is very difficult. The present invention addresses these and other concerns.

SUMMARY OF THE INVENTION

Ground fault detection to reduce arcing in aircraft electrical systems, including aircraft fuel pumps, has become a major concern of the Federal Aviation Administration, and recent studies have promulgated a variety of studies and regulations in an attempt to prevent fuel tank ignition.

The present invention is a current imbalance detection and circuit interrupter particularly attractive for use in aircraft, for protecting a circuit having a line side and a load side. In a currently preferred embodiment, the present invention incorporates the current imbalance detection and circuit interrupter within the existing aircraft power control relay package. For example, in a fuel system application, the current imbalance detection and circuit interrupter is incorporated within the fuel pump control relay package. Therefore, the invention can be retrofit to existing aircraft, or can be utilized in newly constructed aircraft and new aircraft designs already incorporating the relay system. The current imbalance detection and fault circuit interrupter includes a housing, a power supply, a circuit to be monitored, a sensor system, a logic controller, and a power controller (for example: relay, contactor, solid state relay, etc.). In a presently preferred embodiment, the invention can also include a fault indicator, a press to test switch and a reset switch. The power supply is configured to provide power to the sensor, logic controller and the power controller. The sensor system is configured to sense a current imbalance in the circuit being monitored. In one presently preferred embodiment, the sensor system to monitor current imbalance includes a Hall effect device, although the sensor system may alternatively include a current transformer (CT) or giant magneto resistive (GMR) device, for example, or another similar suitable device. The logic controller is configured to monitor a relay control input signal and to process inputs from the sensor.

In a presently preferred embodiment, the logic controller compares the sensor signal with predetermined limits representing acceptable operation and outputs a signal representing a circuit current imbalance when the sensor signal is outside the acceptable limits. The power controller is configured to receive input from the logic controller and remove power to the load side of the circuit when a current imbalance is sensed. In a presently preferred embodiment, the power removal from the load side of the circuit due to a sensed current imbalance is maintained until the power source to the current imbalance detection and circuit interrupter is cycled. In another presently preferred embodiment, power removal is maintained until a reset switch is activated. In a presently preferred embodiment, the fault indicator provides an indication of whether a current imbalance condition has occurred. A press to test switch may be included to check the operation of the unit during maintenance. In a presently preferred embodiment, the fault reset switch is used to reset the fault indicator and the current imbalance detection and circuit interrupter.

The present invention also provides for a method for interrupting an electrical circuit for an electrical load, the electrical circuit having a line side and a load side with a ground fault. In summary, the method comprises providing a supply of power, continually monitoring and sensing the circuit for a current imbalance, continually monitoring the relay control input, receiving input from a logic controller and interrupting the relay control input signal when a current imbalance is sensed, and enabling the fault indicator. In one presently preferred aspect of the method, interrupting of the circuit when a current imbalance is sensed is maintained until the power source is cycled. Typically, the load being supplied with the current being monitored is a motor. In another preferred aspect, the current imbalance detection and circuit interrupter requires no additional signals, inputs, wiring, or sources of power, but takes its power from the circuit being monitored. Alternatively, power may be drawn from an external source, such as an external relay control signal, for example. In one presently preferred use of the method, the load side of the circuit is connected to a fuel pump, and arcing is terminated within the fuel pump.

In one presently preferred embodiment, the present invention is configured to perform ground fault detection and circuit interruption (GFI) and provides important advantages over prior art systems. Since the GFI system of the invention is packaged in the same envelope as an existing relay system, it can be readily retrofit to existing aircraft. Since it is easily operated off of either AC or DC circuits, containing its own power supply powered by the circuit being monitored, it can be used on either AC or DC wired aircraft without further change or rewiring in the aircraft. Furthermore, since the GFI system of the invention operates directly on and is part of the circuit being monitored, it avoids a major issue with prior art systems, which had to be separately connected to the circuit being monitored. Another substantial advantage to the present invention is that it more quickly removes power from the circuit with a fault, since sensing and control is at a single location, thus providing in situ sensing and control.

The present invention also provides for an improved circuit protection device for aircraft that can handle both carry-break and make-carry-break types of ground fault conditions, and make-carry-break fault current amplitudes, by providing the ground fault circuit interrupter with relay contacts which are capable of surviving carry-break and make-carry-break types of ground fault conditions at the anticipated current levels, and that comply with GFI requirements but still maintain the size and configuration necessary for retrofitting to existing aircraft and power controllers. In a preferred aspect, the electronic and electromechanical elements of the current imbalance detection and circuit interrupter are housed within a housing which has a similar form factor to prior art power controllers. The invention connects with the circuit to be monitored and controlled, through the existing power controller electrical connector, and it draws power from the circuit to be controlled. Alternatively, power may be drawn from an external source, such as an external relay control signal, for example. While there are numerous possible form factors, the most desirable form factors are related to the power controllers used in aircraft. The present invention also provides for an improved ground fault circuit interrupter device that will perform a test at power up to confirm that none of the relay contacts have failed in a closed position, and to check that the switching FET which controls the relay coil has not shorted.

Other features and advantages of the present invention will become apparent from the following detailed description taken in conjunction with the accompanying drawings which illustrate, by way of example, the principles of the invention.

BRIEF DESCRIPTION OF THE DRAWINGS

FIG. 4 illustrates a detailed view of a sensor system for the control system of FIG. 1.

FIG. 5 illustrates a block diagram of a second embodiment of a control system of the present invention adapted for a Boeing 747 aircraft, for interrupting the circuit when a current imbalance is sensed.

FIG. 9 illustrates a block diagram of an alternate preferred embodiment of a control system of the present invention adapted for providing the speed of a DC relay in an AC application for interrupting the circuit when a current imbalance is sensed.

DETAILED DESCRIPTION OF THE PREFERRED EMBODIMENTS

Figures 1, 3:
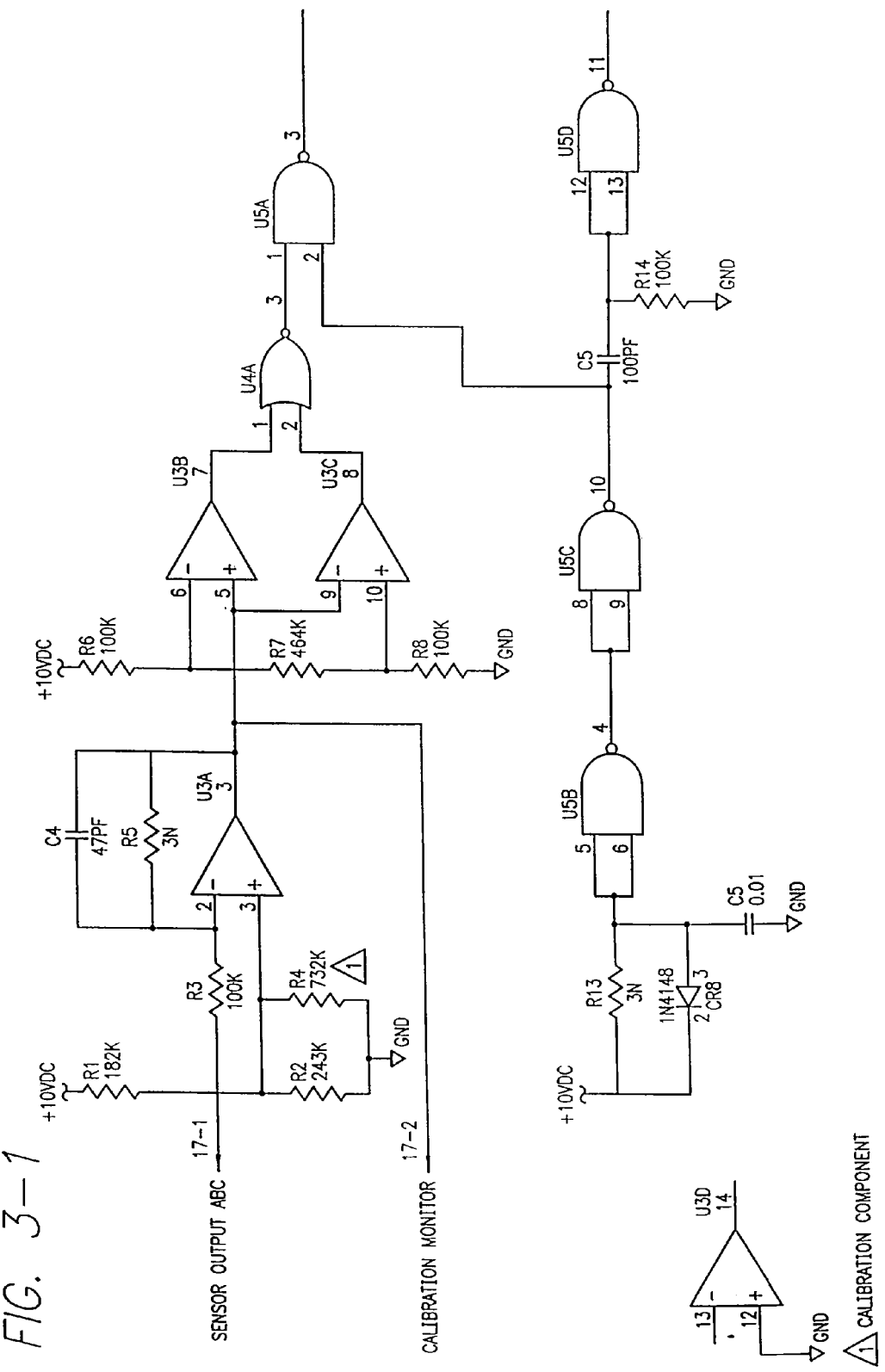
FIG. 1 illustrates a block diagram of a first embodiment of a control system of the present invention adapted for a Boeing 757 aircraft, for interrupting the circuit when a current imbalance is sensed.
FIG. 3 illustrates a detailed view of the logic controller portion of the control system shown in FIG. 1.
Figures 2, 3:
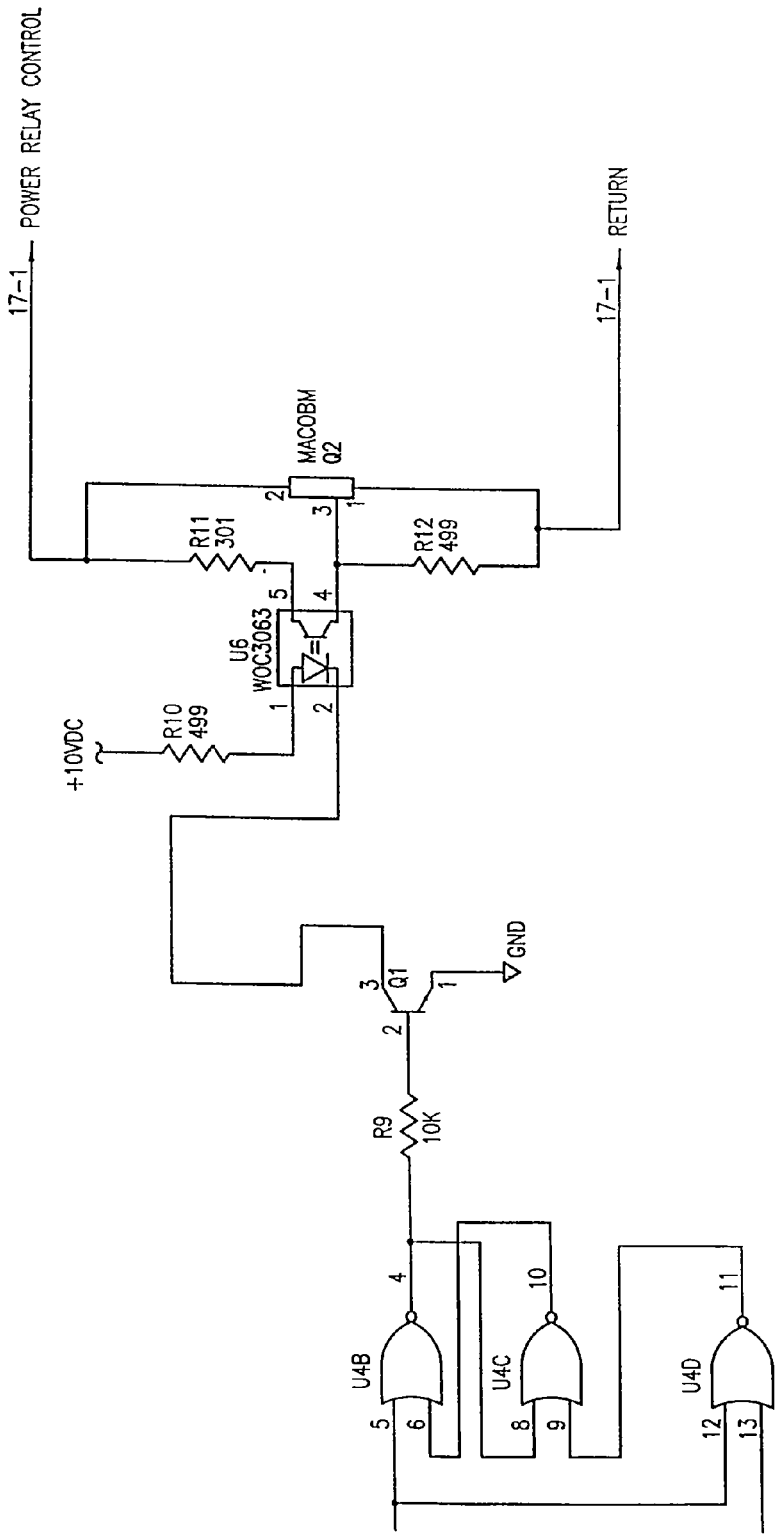

FIG. 1 illustrates a preferred embodiment of a control system 10, adapted for a Boeing 757 aircraft, and FIG. 5 illustrates a preferred embodiment of a control system 10, adapted for a Boeing 747 aircraft, each being constructed in accordance with the present invention for disconnecting power to a load when a current imbalance is sensed. Referring to FIGS. 1 and 5, the aircraft applicable current imbalance detection and circuit interrupter 10 of the invention interrupts a circuit 20 having a line side 24 and a load side 26 with a ground fault. The load may be a motor, or any electrical device drawing a load, where protection of equipment or personnel is desired. The current imbalance detection and circuit interrupter of the invention includes a power supply 30, a sensor system 40, a logic controller 50, a power controller 60, and a fault indicator and reset 55. In a preferred aspect, the sensor system may include a Hall effect device, a current transformer (CT), or a giant magneto resistive (GMR) device, for example, although other similar sensor devices may also be suitable. The power supply is configured to provide power to the logic controller, and the sensor is configured to sense a current imbalance in the line side 20 of the circuit 24, and to output a sensor signal to the logic controller. The logic controller is configured to receive and process the sensor signal input from the sensor and the relay control input signal, and the power controller is configured to receive input from the logic controller and remove power to the load side of the circuit when a current imbalance is sensed.

Figure 2:
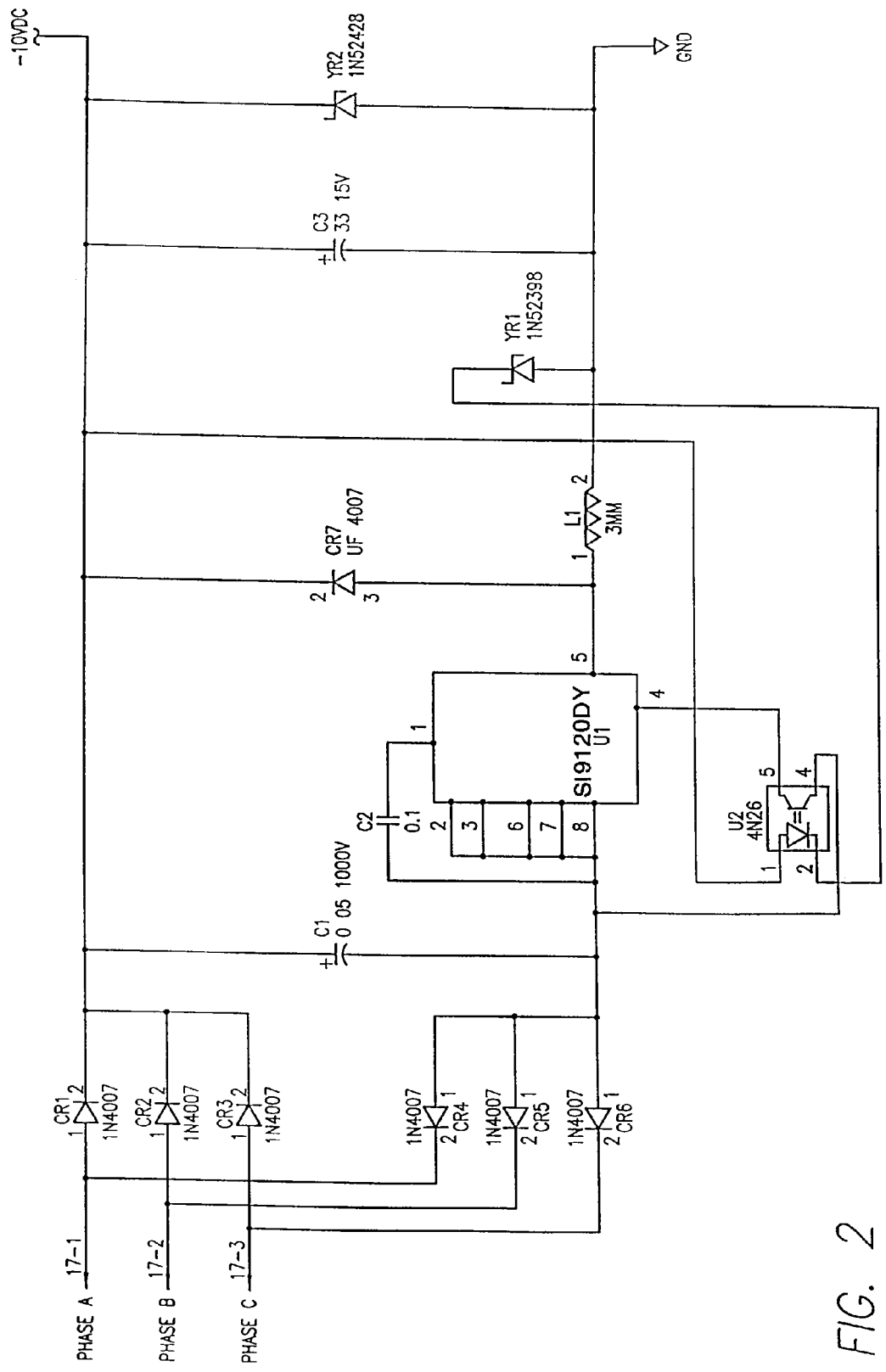
FIG. 2 illustrates a detailed view of the power supply portion of the control system shown in FIG. 1.
Figure 6:
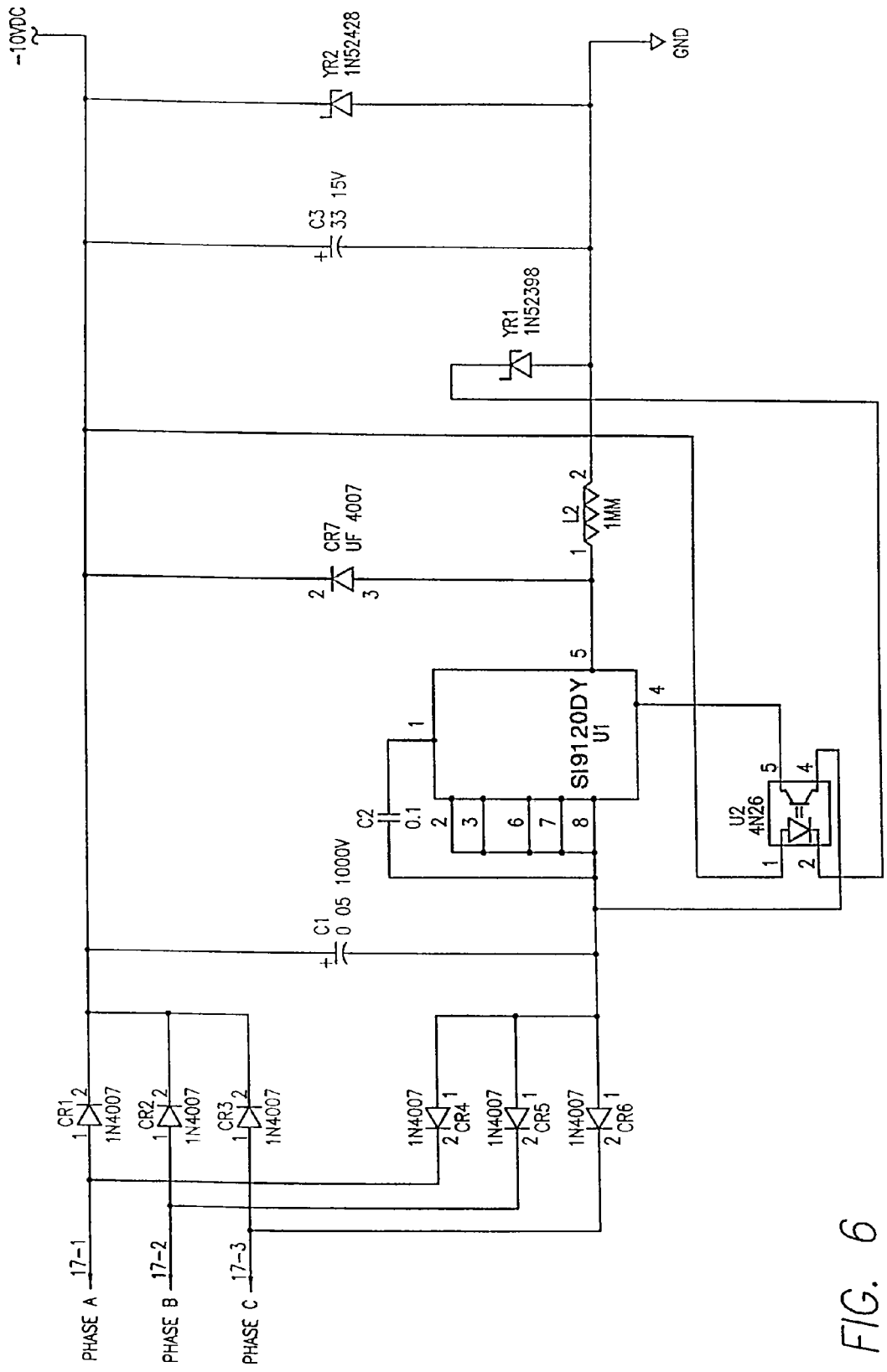
FIG. 6 illustrates a detailed view of the power supply portion of the control system shown in FIG. 5.
Figures 1, 7:
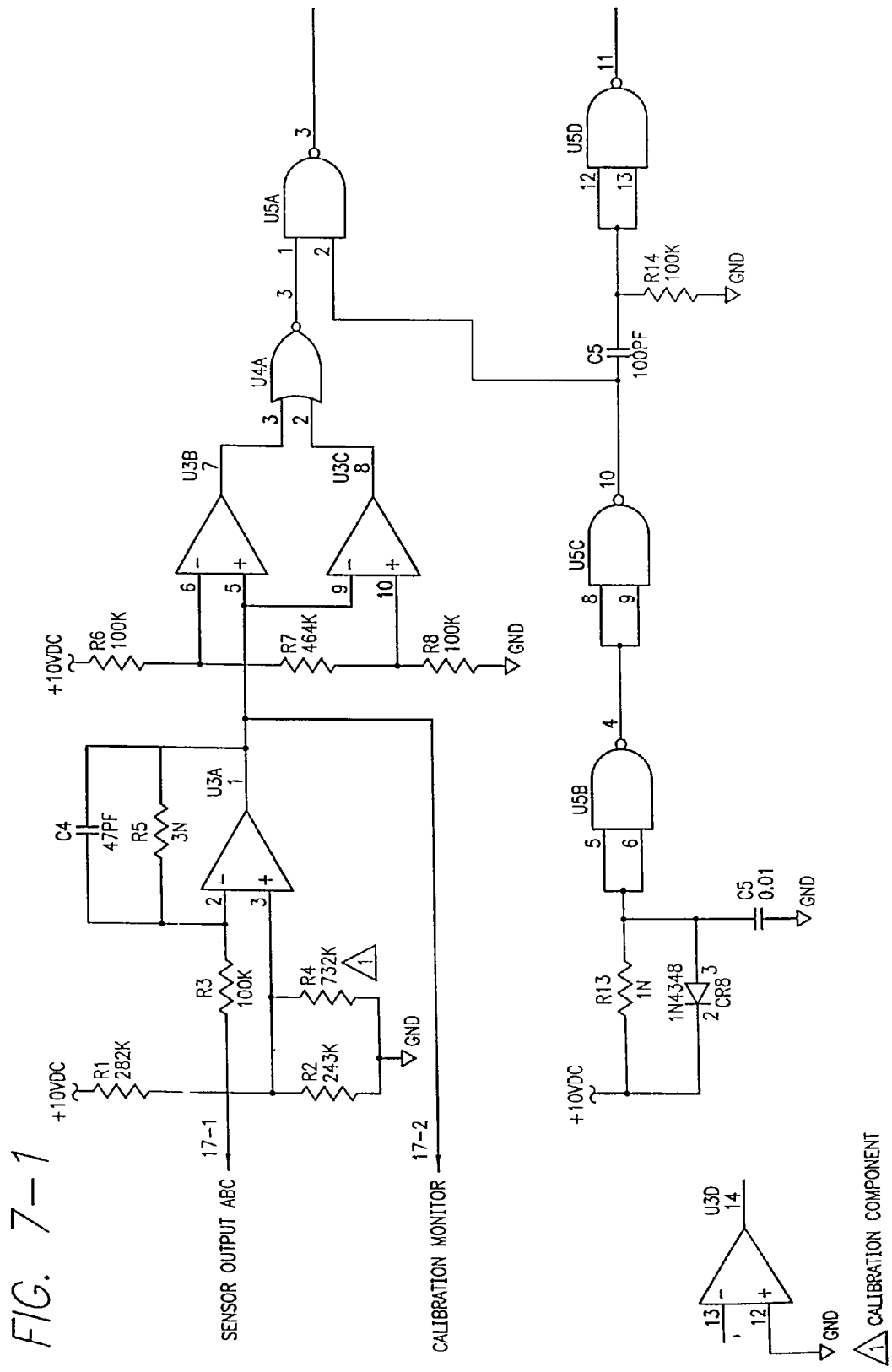
FIG. 7 illustrates a detailed view of the logic controller portion of the control system shown in FIG. 5.
Figures 2, 7:
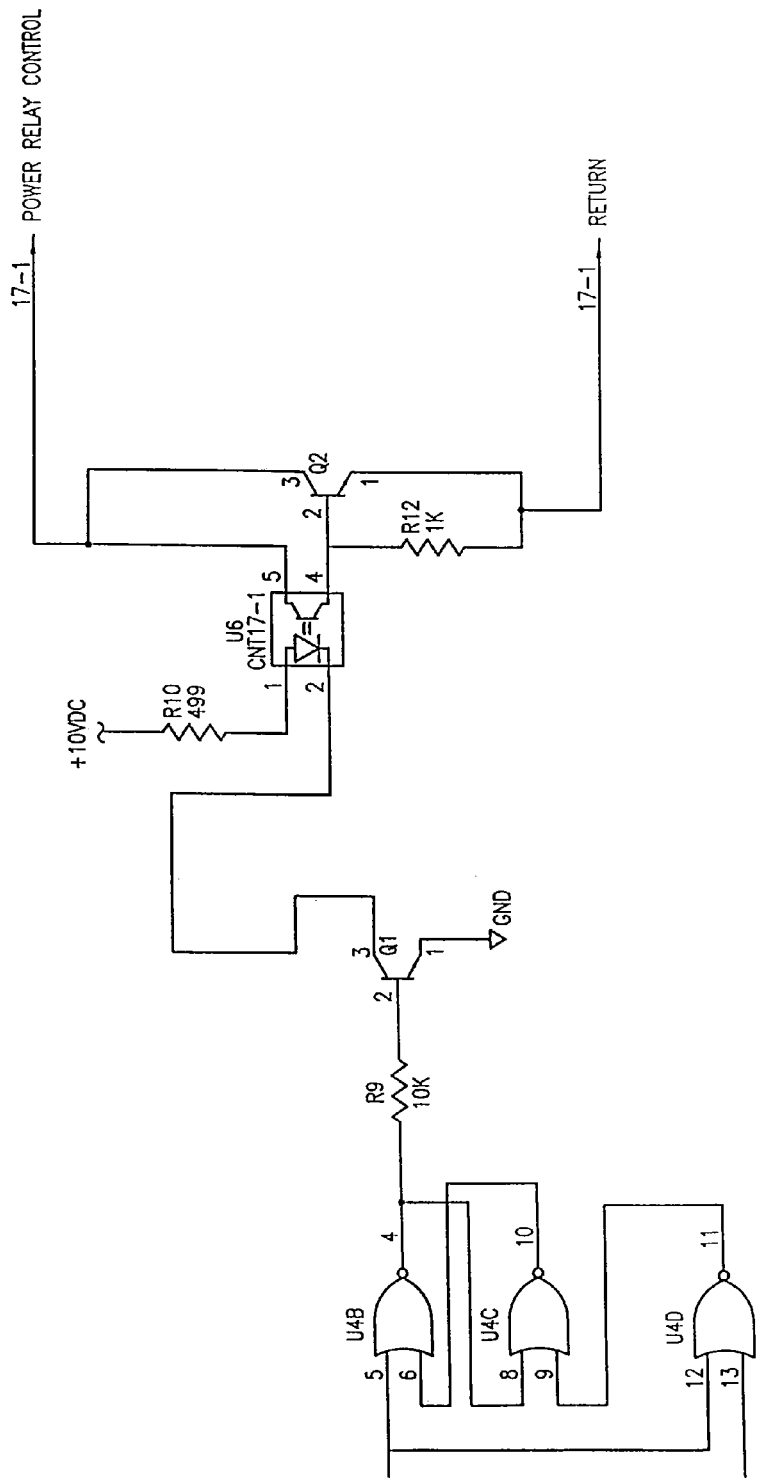
Figure 8:
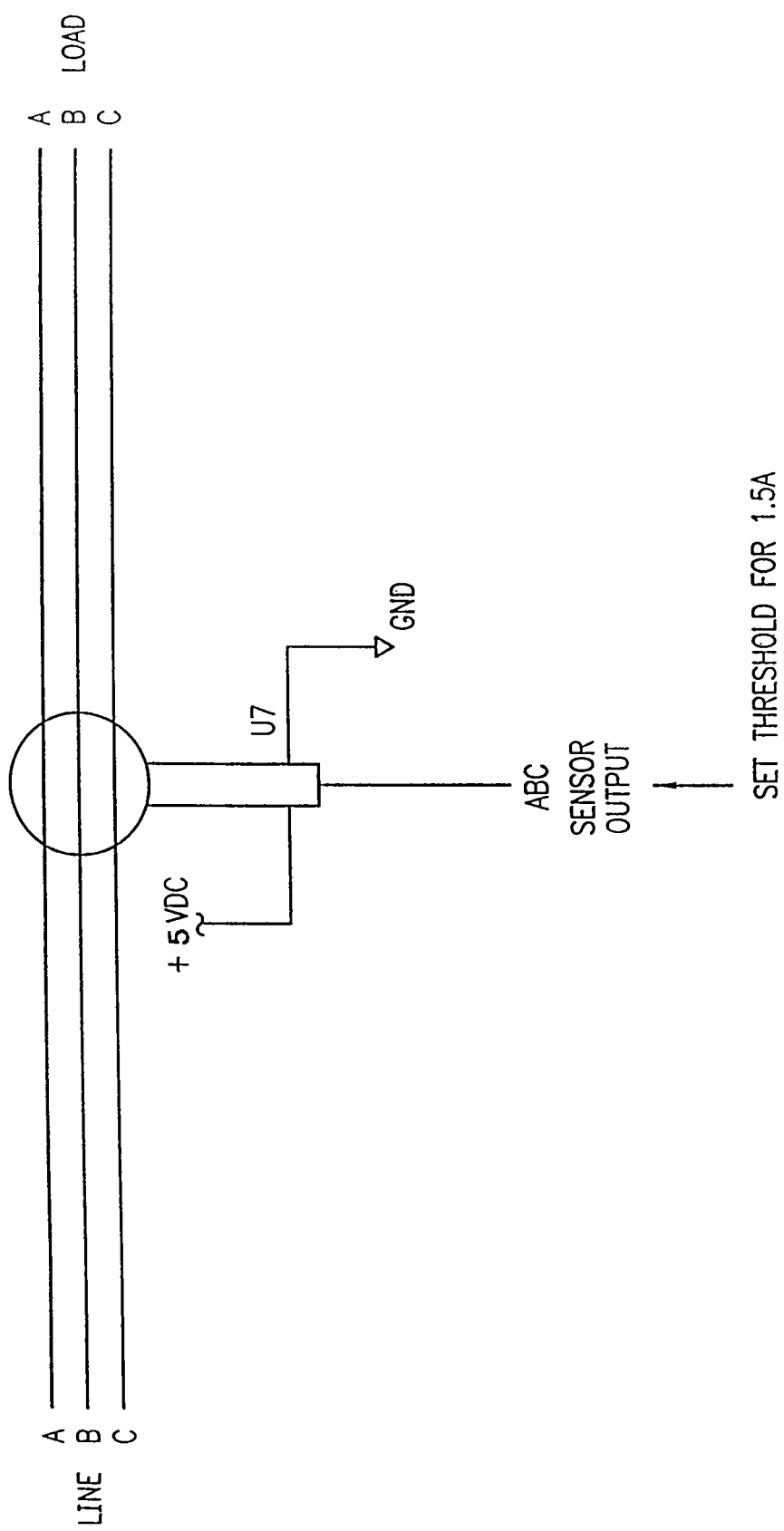
FIG. 8 illustrates a detailed view of a sensor system for the control system of FIG. 5.

FIGS. 2 and 6 illustrate a detailed view of a preferred embodiment of the power supply, and FIGS. 3 and 7 illustrate a detailed view of a preferred embodiment of the logic controller. Referring to FIGS. 4 and 8, showing a sensor for use in the control system of the invention, in a preferred embodiment of the present invention, the sensor, which is an Amploc Pro 5 Hall effect linear current sensor with an output of 233 mV/A when operated at 10V. All three line side wires pass through the sensor core. Kirchoff's current law states that the net current in a node is 0. Considering the wye connection point of the load side pump winding, the net current in the phase windings, when algebraically summed, is 0. If a ground fault exists, that is where the current is supplied through the sensor but does not return through the sensor, the algebraic sum of the currents in the phase wires would be equal to the ground fault current.

Referring to FIGS. 3 and 7, in a preferred embodiment, the output of the sensor is approximately one-half of the supply voltage, for no measured imbalance. Amplifier U3A amplifies the signal by a factor of 10. The gain is set by the ratio of resistors R5 and R3. The 3 db point is where the reactance of capacitor C4 is equal to the resistance of R5. This occurs at 3386 Hz. Resistors R1, R2, and R4 bias the amplifier and have been selected so that a maximum value of 1 meg, for resistor R4, is required to adjust the amplifier output to mid supply with the sensor at its specified worst case high output. Calibration for the worst case low output of the sensor is easily achieved.

Amplifiers U3B and U3C, and resistors R6, R7, and R8 are set to detect a current imbalance of 3.0 Arms, for example, although other appropriate thresholds may also be suitable. A high output from amplifier U3B or U3C indicates an imbalance is present in excess of the 3.0 Arms threshold, or other selected threshold. IC U4A "OR's" the outputs from amplifiers U3B and U3C. A logic 0 at its output indicates one or the other failure condition is present. Simultaneous imbalance inputs can be handled but are physically not possible since a positive imbalance cannot exist at the same time as a negative imbalance.

If a fault condition exists, it passes through IC U5A presenting a logic 1 to the latch comprised of ICs U4B and U4C. A logic 1, at pin 5, forces the output pin 4 low, turning transistor Q1 off, which removes the drive signal to the power relay control stage 17-1. Pin 9, the other input to the latch, is normally at logic 0. This will cause pin 10 to go high, setting the latch by presenting a logic 1 to pin 6.

In a preferred embodiment, the power-up sequence initializes the power control section to the non-operate mode. This is accomplished by presenting a logic 0 to pin 2 of IC U5A to mimic a current imbalance condition.

The power-up reset pulse created by IC U5B, resistor R13, capacitor C5 and diode CR8 is typically 7 msec. The reset is determined by the time it takes to charge capacitor C5 through resistor R13 to the threshold set by IC U5B. Diode CR8 provides a quick reset.

At power-up, the GFI will perform a test to confirm that none of the relay contacts have failed closed, and to check that the switching FET which controls the relay coil has not shorted. These two failures are critical items, which may prevent the GFI from interrupting a fault current, and are therefore checked by the power-up built-in test (BIT). With the 3-phase 115 VAC power available at the time when the control voltage is switched ON, the status of the relay contacts is checked. The internal electronic circuits check to see if the contacts are all open just before the relay is commanded closed, and also checks to see if all of the contacts are closed after the relay is commanded closed. If a fault with the relay is detected, power to the relay coil is inhibited, and the mechanical fault indicator is activated. In another aspect, it may also be advantageous to incorporate an auxiliary contact into the relay design, while still maintaining the GFI design within the packaging constraints, in which case the status of the relay main contacts for the 3-phase 115 VAC power could be checked by checking the status of the auxiliary contact.

Referring to FIGS. 2 and 6, diodes CR1, CR2, CR3, CR4, CR5, and CR6 form a full-wave three-phase bridge. Capacitor C1 acts as the storage device for the 281V peak voltage produced by the bridge. The regulator is a preferably buck-type configuration with the abnormal architecture of having the inductor in the lower side. This is acceptable because the circuit does not have to be referenced to earth ground. In fact, the on-board electrical ground is approximately 270 V above earth ground.

Preferably, the switcher operates in a non-conventional mode. If it senses that output voltage is low, it turns on and remains on until the current through inductor L1 reaches a pre-determined amount. Otherwise, the cycle is skipped. Energy is stored in inductor L1 and transferred to output capacitor C3 through diode CR7. Proper regulation is determined by Zener VR1 and opto-coupler U2. Capacitor C2 serves to store a small amount of energy that the regulator uses to operate its internal circuitry.

Referring to FIGS. 9-13, illustrating an alternate preferred embodiment of a control system of the present invention adapted for an AC-DC application, to interrupt the circuit when a current imbalance is sensed. As is shown in FIG. 9, the aircraft applicable current imbalance detection and circuit interrupter 10 of the invention interrupts a circuit 20 having a line side 24 and a load side 26 with a ground fault. The load may be a motor, or any electrical device drawing a load, where protection of equipment or personnel is desired. The current imbalance detection and circuit interrupter of the invention includes a power supply 30, a sensor system 40, a logic controller 50, a power controller 60, and a fault indication and reset 55. In a preferred aspect, the sensor system may include a Hall effect device, a current transformer (CT), or a giant magneto resistive (GMR) device, for example, although other similar sensor devices may also be suitable. The power controller can be controlled by direct current (DC), or alternatively may be controlled by alternating current (AC). The power supply is configured to provide power to the logic controller, and the sensor is configured to sense a current imbalance in the line side 20 of the circuit 24, and to output a sensor signal to the logic controller. The logic controller is configured to receive the relay control input signal and to receive and process the sensor signal input from the sensor, and the power controller is configured to receive input from the logic controller and remove power to the load side of the circuit when a current imbalance is sensed.

Figure 10:
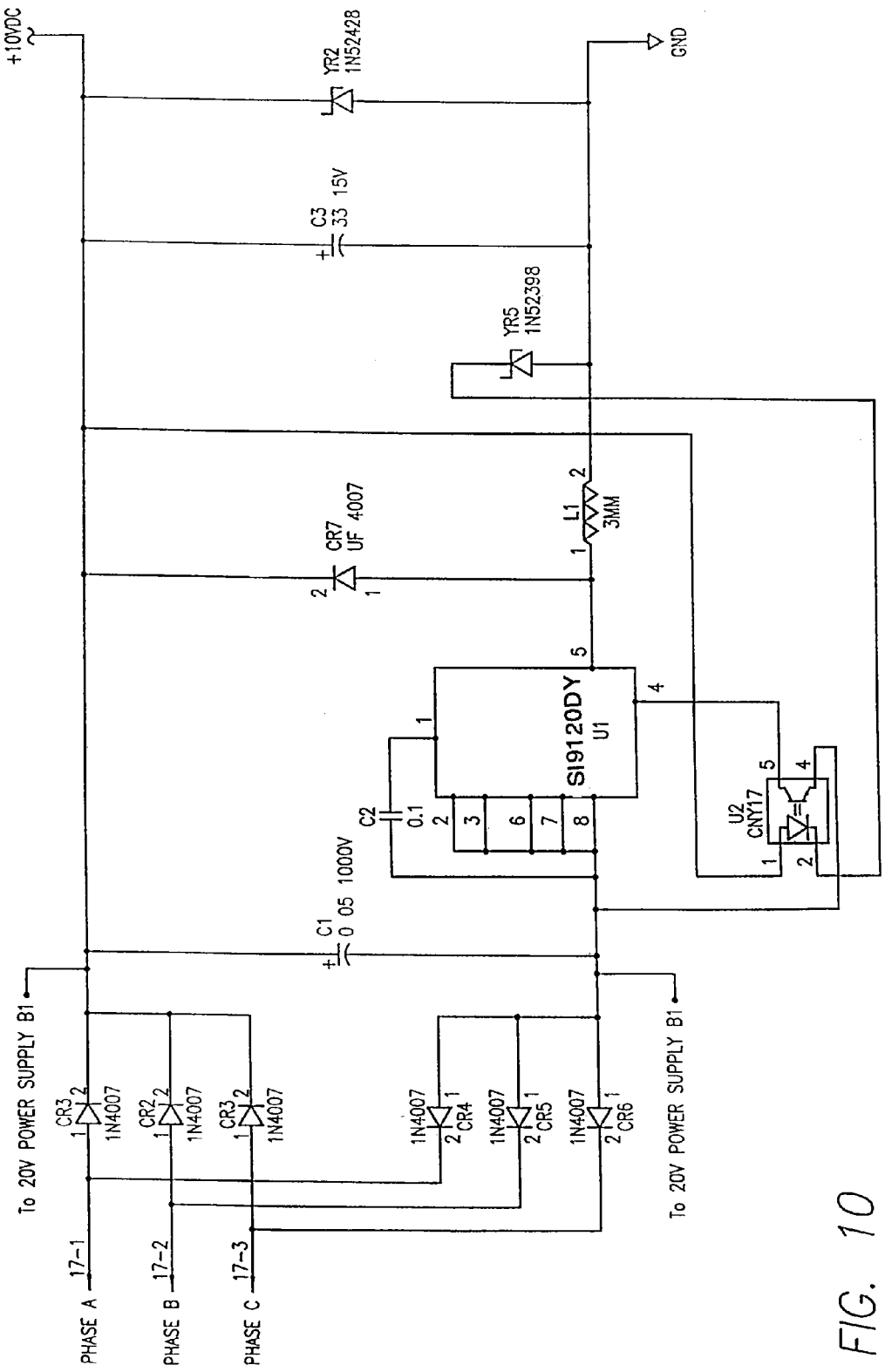
FIG. 10 illustrates a detailed view of a preferred embodiment of one section of the power supply portion of the control system shown in FIG. 9.
Figure 11:
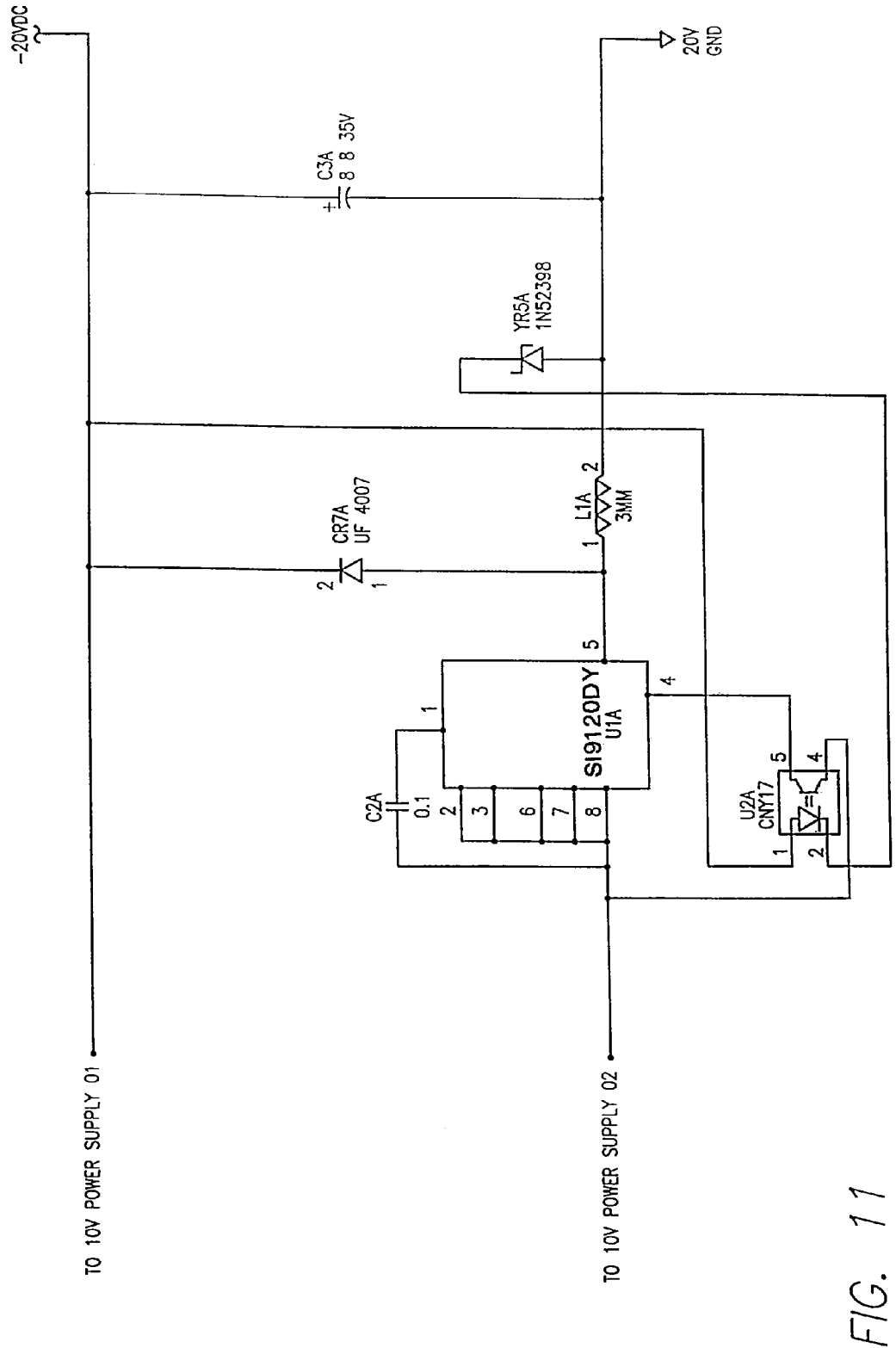
FIG. 11 illustrates a detailed view of a second section of the power supply portion of the control system shown in FIG. 9.
Figures 1, 12:
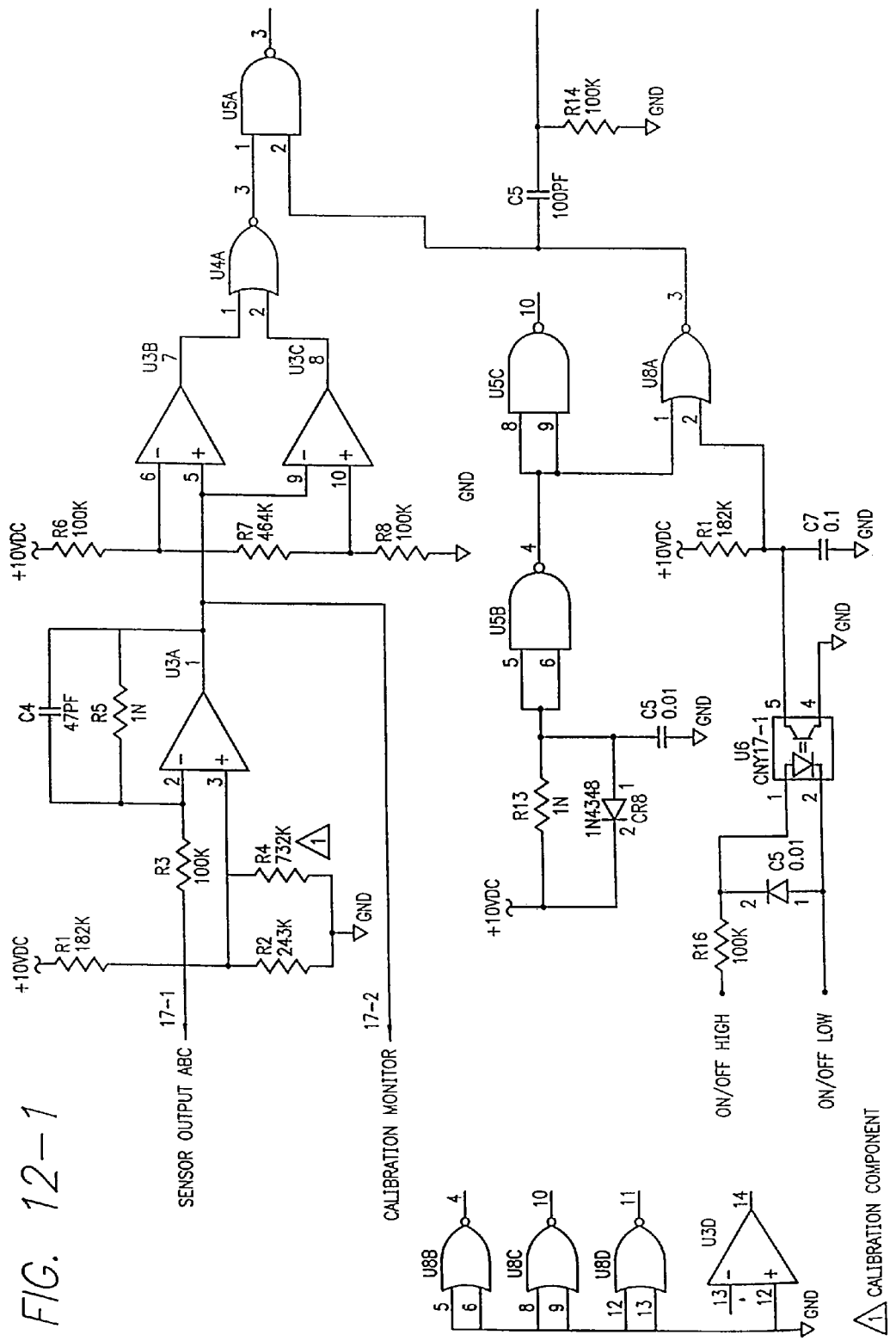
FIG. 12 illustrates a detailed view of the preferred logic controller portion of the control system shown in FIG. 9.
Figures 2, 12:
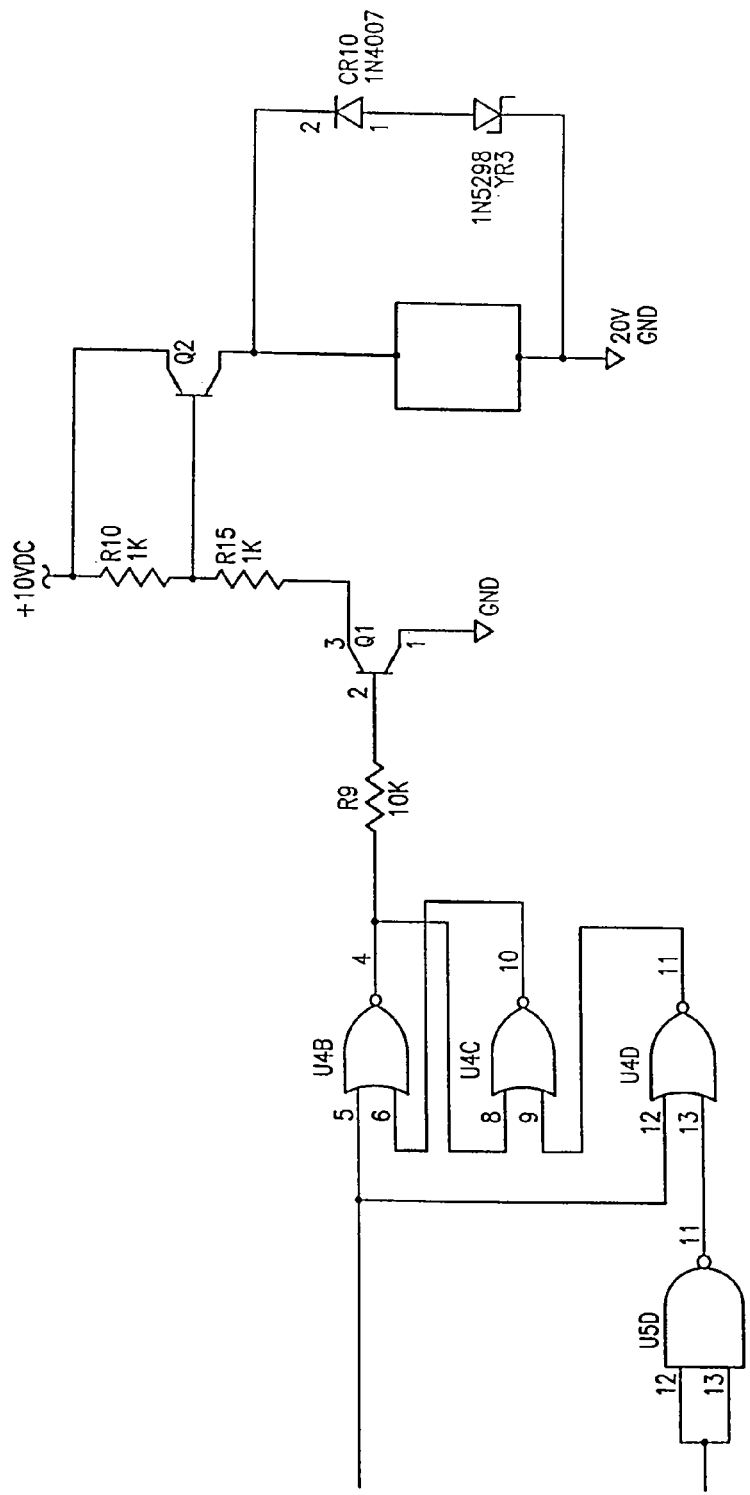
Figure 13:
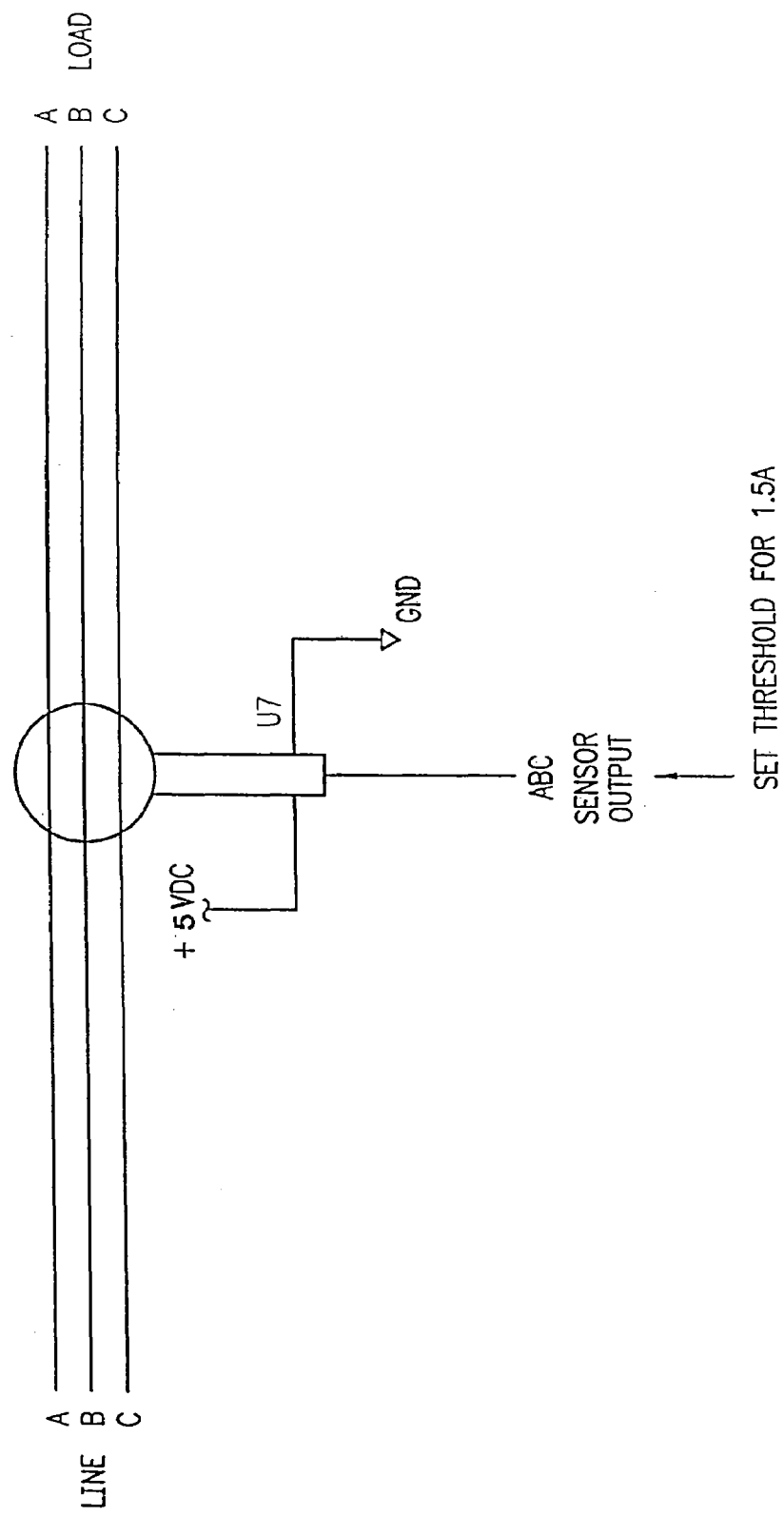
FIG. 13 illustrates a detailed view of a sensor system for the control system of FIG. 9.

FIGS. 10 and 11 illustrate a detailed view of a preferred embodiment of the power supply. FIG. 12 illustrates a detailed view of a preferred embodiment of the logic controller. Referring to FIG. 13, showing a sensor for use in the control system of the invention, in a preferred embodiment of the present invention, the sensor, which is an Amploc Pro 5 Hall effect linear sensor with an output of 233 mV/A when operated at 10V. All three line side wires pass through the sensor core. Kirchoff's current law states that the net current in a node is 0. Considering the wye connection point of the load side pump winding, the net current in the phase windings, when algebraically summed, is 0. If a ground fault exists, that is where the current is supplied through the sensor but does not return through the sensor, the algebraic sum of the currents in the phase wires would be equal to the ground fault current.

Referring to FIG. 12, in a preferred embodiment, the output of the sensor is approximately one-half of the supply voltage, for no measured imbalance. Amplifier U3A amplifies the signal by a factor of 10. The gain is set by the ratio of resistors R5 and R3. The 3 db point is where the reactance of capacitor C4 is equal to the resistance of R5. This occurs at 3386 Hz. Resistors R1, R2, and R4 bias the amplifier and have been selected so that a maximum value of 1 meg, for resistor R4, is required to adjust the amplifier output to mid supply with the sensor at its specified worse case high output. Calibration for the worse case low output of the sensor is easily achieved.

Amplifiers U3B and U3C, and resistors R6, R7, and R8 are set to detect a current imbalance of 3.0 Arms, for example, although other appropriate thresholds may also be suitable. A high output from amplifier U3B or U3C indicates an imbalance is present in excess of the 3.0 Arms threshold, or other selected threshold. IC U4A "OR's" the outputs from amplifiers U3B and U3C. A logic 0 at its output indicates one or the other failure condition is present. Simultaneous imbalance inputs can be handled but are physically not possible since a positive imbalance cannot exist at the same time as a negative imbalance.

If a fault condition exists, it passes through IC U5A presenting a logic 1 to the latch comprised of ICs U4B and U4C. A logic 1, at pin 5, forces the output pin 4 low, turning transistor Q1 off, which removes the drive signal to the power control stage. Pin 9, the other input to the latch, is normally at logic 0. This will cause pin 10 to go high, setting the latch by presenting a logic 1 to pin 6.

In a preferred embodiment, the power-up sequence initializes the power control section to the non-operate mode. This is accomplished by presenting a logic 0 to pin 2 of IC U5A to mimic a current imbalance condition.

The power-up reset pulse created by IC U5B, resistor R13, capacitor C5 and diode CR8 is typically 7 msec. The reset is determined by the time it takes to charge capacitor C5 through resistor R13 to the threshold set by IC U5B. Diode CR8 provides a quick reset.

At power-up, the GFI will perform a test to confirm that none of the relay contacts have failed closed, and to check that the switching FET which controls the relay coil has not shorted. These two failures are critical items, which may prevent the GFI from interrupting a fault current, and are therefore checked by the power-up built-in test (BIT). With the 3-phase 115 VAC power available at the time when the control voltage is switched ON, the status of the relay contacts is checked. The internal electronic circuits check to see if the contacts are all open just before the relay is commanded closed, and also checks to see if all of the contacts are closed after the relay is commanded closed. If a fault with the relay is detected, power to the relay coil is inhibited, and the mechanical fault indicator is activated. In another aspect, it may also be advantageous to incorporate an auxiliary contact into the relay design, while still maintaining the GFI design within the packaging constraints, in which case the status of the relay main contacts for the 3-phase 115 VAC power could be checked by checking the status of the auxiliary contact.

Referring to FIG. 10 and 11, diodes CR1, CR2, CR3, CR4, CR5, and CR6 form a full-wave three-phase bridge. Capacitor C1 acts as the storage device for the 281V peak voltage produced by the bridge. The regulators are a buck-type configuration with the abnormal architecture of having the inductor in the lower side. This is acceptable because the circuit does not have to be referenced to earth ground. In fact, the on-board electrical ground is approximately 270V and 260V above earth ground for the 10 V and 20V supplies respectively.

Preferably, the switcher operates in a non-conventional mode. If it is sensed that an output voltage is low, the corresponding controller turns on and remains on until the current through inductor L1 or L1A reaches a pre-determined amount. Otherwise, the cycle is skipped. Energy is stored in inductor L1 or L1A and transferred to output capacitor C3 or C3A through diode CR7 or CR7A. Proper regulation is determined by Zener VR1 or VR1A and opto-coupler U2 or U2A. Capacitor C2 or C2A serves to store a small amount of energy that each respective regulator uses to operate its internal circuitry.

Most aircraft presently in service utilize circuit breakers with the limitations previously discussed. While the electronic and electromechanical aspects of the present invention impart additional protection to the protection provided by such circuit breakers, it would be desirable to be able to package the invention in a form which would allow ease of retrofit to existing aircraft, newly constructed and new aircraft designs, thus bringing the benefits of the invention to a wider range of applications. Accordingly, in a further presently preferred aspect of the invention, the electronic and electromechanical elements of the current imbalance detection and circuit interrupter are housed within a housing which has a similar form factor to prior art power controllers. The invention connects with the circuit to be monitored and controlled through the existing power controller electrical connector, and it draws power from the circuit to be controlled. Alternatively, power may be drawn from an external source, such as an external relay control signal, for example. While there are numerous form factors which can impart additional protection to the protection provided by such circuit breakers, one of our form factors is related to the power controllers used in the Boeing 757 aircraft and the like, which have an installed height of approximately 1.78 inches above the mounting surface, a width of approximately 1.53 inches above the mounting surface, and a total height of 3.28 inches from the top to the bottom of the electrical terminals.

Figure 14:
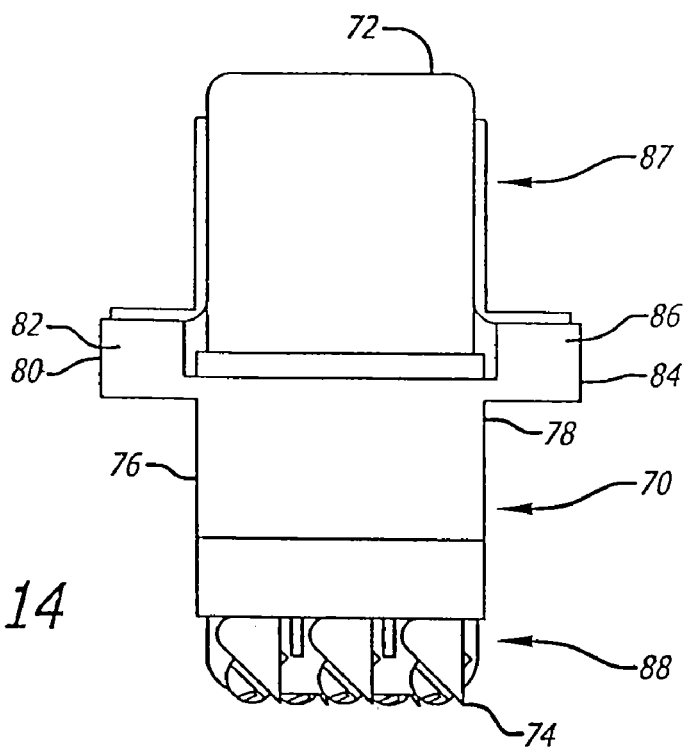
FIG. 14 is a side elevational view of an aircraft applicable current imbalance detection and circuit interrupter according to the present invention.

With reference to FIG. 14, in one presently preferred aspect of the invention, each of the above described circuit configurations can be advantageously contained in a corresponding housing 70, which is typically no more than about 3.28 inches (about 8.33 cm.) from top 72 to bottom 74, no more than about 1.53 inches (about 3.89 cm.) wide along its front 76 and rear 78 sides, and no more than about 2.51 inches (about 6.38 cm.) from the front side 80 of the front mounting flange 82 to the rear side 84 of the rear mounting flange 86. The housing also includes a relay 87, typically a one-inch cube relay, having contacts rated for a 25 Amp GFI to make-carry-break fault current levels of about 500 Amps, and 15 or more ground fault cycles with no appreciable change in contact resistance, or a relay rated for a 50 Amp GFI to make-carry-break fault current levels of about 1500 Amps, and 15 or more ground fault cycles with no appreciable change in contact resistance.

Figure 15:
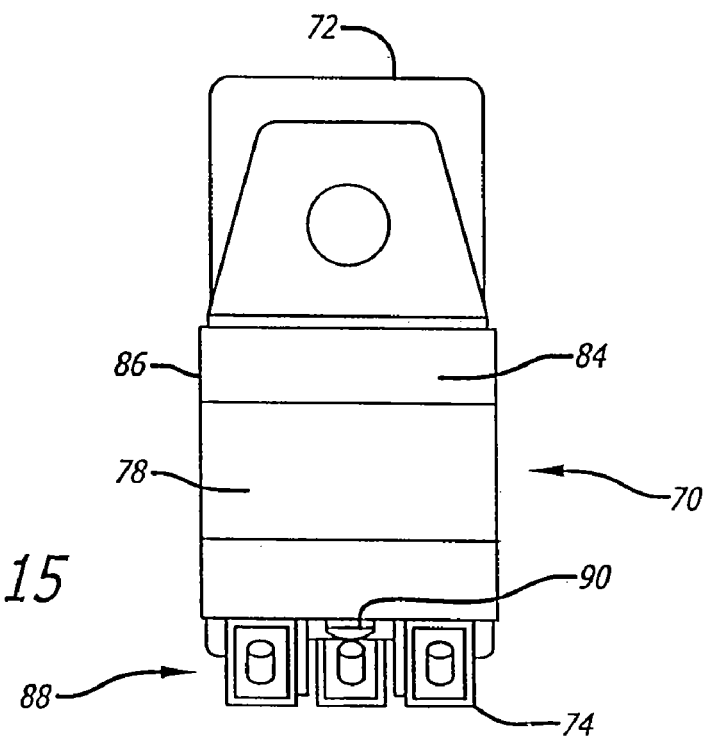
FIG. 15 is a rear view of the aircraft applicable current imbalance detection and circuit interrupter shown in FIG. 14.
Figure 16:
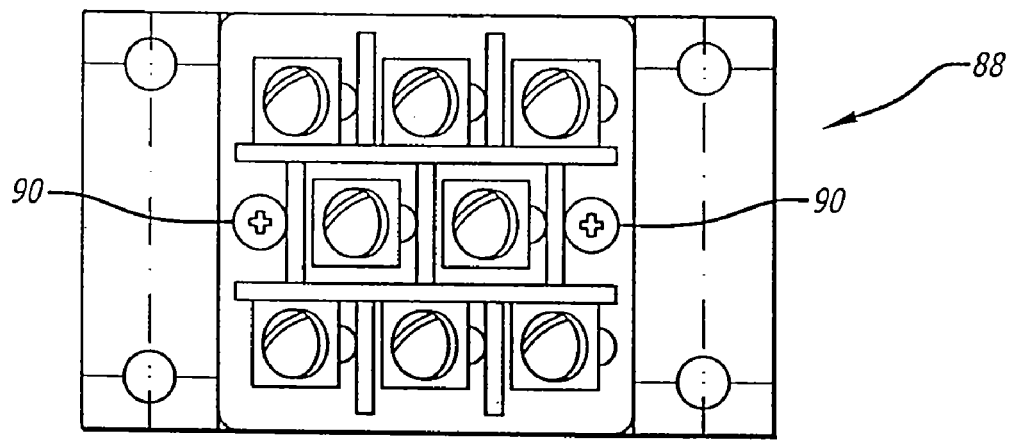
FIG. 16 is a bottom view of the aircraft applicable current imbalance detection and circuit interrupter shown in FIG. 14.

Referring to FIG. 14, FIG. 15, and FIG. 16, an electrical connector means such as the terminal block or connector plate 88 is provided at the bottom of the aircraft applicable current imbalance detection and circuit interrupter housing, typically with eight screw-type electrical connectors, A1, A2, X1, B1, B2, C1, C2, and X2, although other conventional types of wire connectors may also be suitable. Referring to FIG. 4, FIG. 8, FIG. 13 and FIG. 16, the connectors A1 and A2 accommodate a first line and load A; the connectors B1 and B2 accommodate a second line and load B, and the connectors C1 and C2 will accommodate a third line and load C. As is shown in FIG. 15 and FIG. 16, the connector plate is mounted to the housing of the aircraft applicable current imbalance detection and circuit interrupter by mounting screws 90, which extend through sleeves 92 in the housing, illustrated in FIG. 18 and FIG. 19, as is explained further below.

Figure 17:
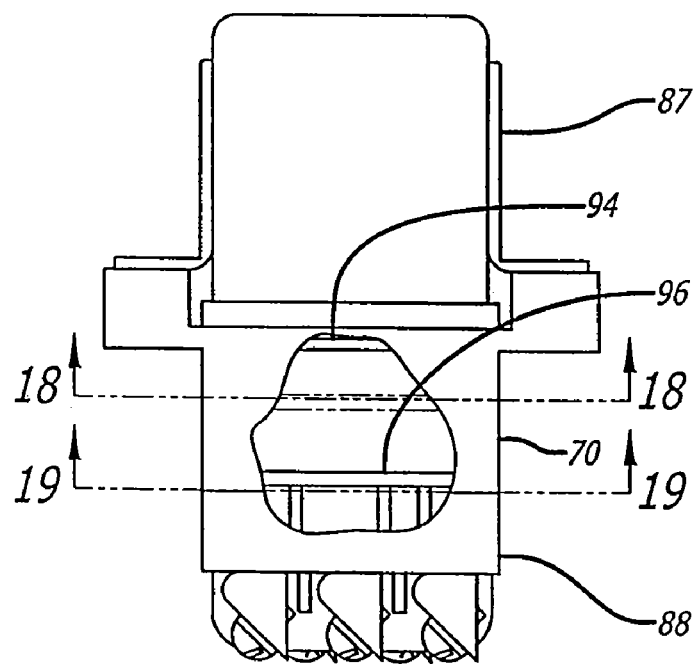
FIG. 17 is a side elevational partial cutaway view of the aircraft applicable current imbalance detection and circuit interrupter shown in FIG. 14.
Figure 18:
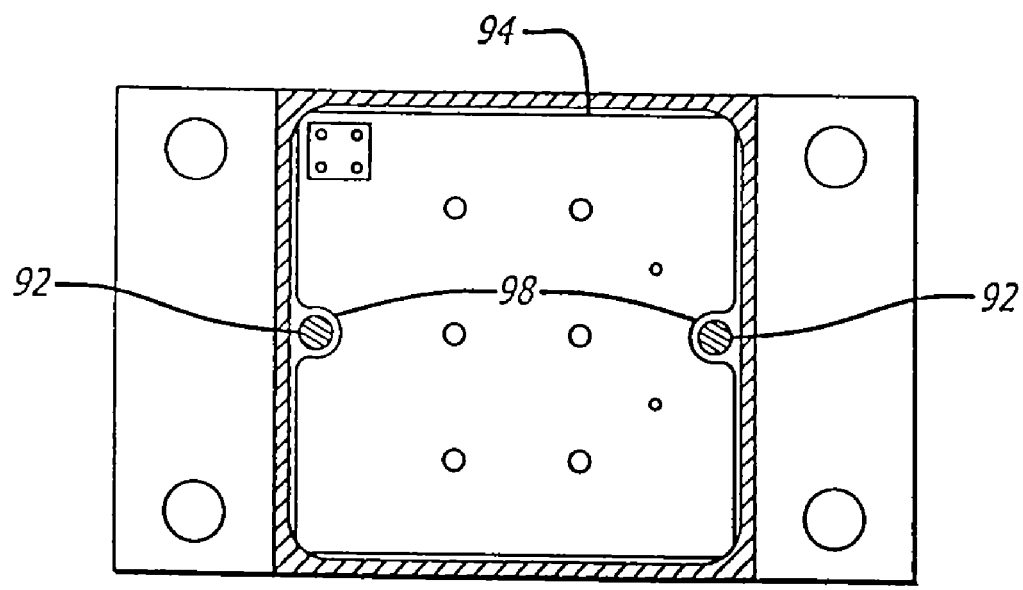
FIG. 18 is a sectional view of the aircraft applicable current imbalance detection and circuit interrupter taken along line 18-18 of FIG. 17.
Figure 19:
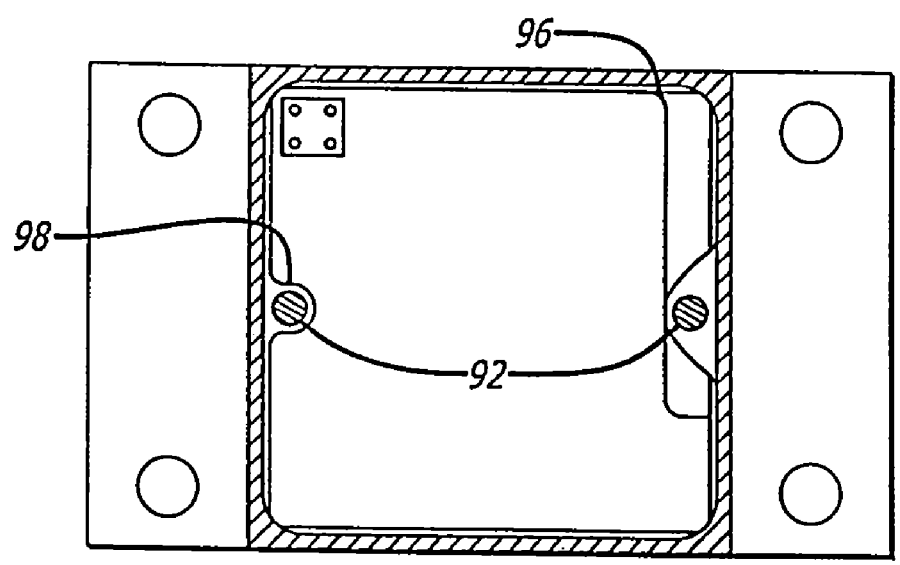
FIG. 19 is a sectional view of the aircraft applicable current imbalance detection and circuit interrupter taken along line 19-19 of FIG. 17.

Referring to FIG. 17, FIG. 18 and FIG. 19, one or more circuit boards, such as a first printed circuit board 94 and a second printed circuit board 96, for mounting the components of the above described circuit configurations, can be mounted within the housing with notches 98 in the printed circuit boards fitting around the sleeves 92 of the mounting screws 90.

It should be appreciated that while the logic controller has been disclosed as being implemented as an electronic circuit, the logic controller may also be implemented as a microprocessor based logic controller, and other components of the aircraft applicable current imbalance detection and circuit interrupter of the invention may also be implemented at least in part by one or more microprocessors.

From the above, it may be seen that the present invention provides a method and apparatus for suppressing arcs in electrical equipment in aircraft which may be adapted to a variety of systems and components. As such, it provides additional reliable and rapid disconnect of power to the existing systems, thus reducing damage from ground faults in the circuits. While a particular form of the invention has been illustrated and described it will also be apparent that various modifications can be made without departing from the spirit and scope of the invention. Accordingly, it is not intended that the invention be limited except as by the appended claims.

What is claimed is:

1. An aircraft applicable current imbalance detection and circuit interrupter device for monitoring the current within an electrical circuit and interrupting the electrical circuit, the electrical circuit having a line side and a load side with an electrical load connected thereto, the aircraft applicable current imbalance detection and circuit interrupter comprising:

a housing including electrical connector means for connecting to the electrical circuit line side and load side;

a sensor system disposed in the housing for sensing a current imbalance in the electrical circuit and for providing a sensor signal indicating the existence of an undesirable current within the electrical circuit based on said sensing of said current imbalance;

a logic controller disposed in the housing and configured to receive the sensor signal from the sensor system and to output a fault signal representing a fault; and a power controller disposed in the housing configured to receive said fault signal from the logic controller and to remove power to the load side of the electrical circuit responsive to the fault signal from the logic controller, the power controller including a power relay having contacts capable of surviving carry-break and make-carry-break types of ground fault conditions at anticipated current levels.

2. The aircraft applicable current imbalance detection and circuit interrupter device of claim 1, wherein the aircraft applicable current imbalance detection and circuit interrupter interrupts arcing within a device being operated by the electrical circuit.

3. The aircraft applicable current imbalance detection and circuit interrupter device of claim 1, wherein the housing has an envelope compatible with that of existing power controllers for the aircraft and using the same monitoring configurations.

4. The aircraft applicable current imbalance detection and circuit interrupter device of claim 1, wherein the electrical connector means comprises an electrical connector plate on the housing connected to the line side and load side of the electrical circuit being monitored.

5. The aircraft applicable current imbalance detection and circuit interrupter device of claim 4, wherein said electrical connector plate comprises a plurality of electrical connectors.

6. The aircraft applicable current imbalance detection and circuit interrupter device of claim 5, wherein said electrical connector plate comprises a first pair of connectors accommodating a first load line, a second pair of connectors accommodating a second load line, and a third pair of connectors accommodating a third load line.

7. The aircraft applicable current imbalance detection and circuit interrupter device of claim 1, wherein the aircraft applicable current imbalance detection and circuit interrupter is configured to test during a power up sequence to determine if the aircraft applicable current imbalance detection and circuit interrupter is operating properly.

8. An aircraft applicable current imbalance detection and circuit interrupter device for interrupting an electrical circuit to an electrical load, the electrical circuit having a line side and a load side, the aircraft applicable current imbalance detection and circuit interrupter comprising:

a housing having electrical connector means for connecting to the electrical circuit line side and load side;

a sensor system disposed in the housing for sensing a current imbalance in the electrical circuit and for providing a sensor signal indicating the existence of a current imbalance within the electrical circuit based on said sensing of said current imbalance;

a direct current (DC) controlled power controller configured to remove power to the load side of the electrical circuit when de-energized, the power controller including a power relay having contacts capable of surviving carry-break and make-carry-break types of ground fault conditions at anticipated current levels;

a logic controller disposed in the housing and configured to receive an external relay control signal and the sensor signal from the sensor system, to compare the sensor signal with a predetermined range for acceptable operation for the electrical circuit, to output a fault signal representing a current imbalance and de-energized the power controller when the sensor signal exceeds said predetermined range;

a fault indicator configured to receive said fault signal from the logic controller, to indicate a current imbalance condition has occurred; and a reset switch to reset the fault indicator and the current imbalance detection and circuit interrupter;

wherein the housing has a form factor that packages the current imbalance detection and circuit interrupter circuitry in a space compatible with an existing power controller used in the aircraft.

9. The aircraft applicable current imbalance detection and circuit interrupter device of claim 8 wherein:

the logic controller receives the external relay control signal and processes this signal to energize and de-energize the power controller; and the external relay control signal, depending on the aircraft, may be alternate current (AC) or direct current (DC).

10. The aircraft applicable current imbalance detection and circuit interrupter device of claim 9 wherein the logic controller is capable of accepting and processing either an AC or DC external relay control signal.

11. The aircraft applicable current imbalance detection and circuit interrupter device of claim 8, wherein said contacts are rated for a 25 Amp current to make-carry-break fault current levels of about 500 Amps with no appreciable change in contact resistance.

12. The aircraft applicable current imbalance detection and circuit interrupter device of claim 8, wherein said contacts are rated for a 50 Amp current to make-carry-break fault current levels of about 1500 Amps with no appreciable change in contact resistance.

13. The aircraft applicable current imbalance detection and circuit interrupter device of claim 8, wherein the aircraft applicable current imbalance detection and circuit interrupter suppresses arcing within a device being operated by the electrical circuit.

14. The aircraft applicable current imbalance detection and circuit interrupter device of claim 8, wherein the aircraft applicable current imbalance detection and circuit interrupter discontinues ground fault conditions within a device being operated by the electrical circuit.

15. The aircraft applicable current imbalance detection and circuit interrupter device of claim 8, wherein said aircraft applicable current imbalance detection and circuit interrupter is sized and configured to replace an existing aircraft power controller.

16. The aircraft applicable current imbalance detection and circuit interrupter device of claim 8, wherein the electrical connection means comprises an electrical connector for connecting to the line side, the load side and the external relay control signal.

17. The aircraft applicable current imbalance detection and circuit interrupter device of claim 16, wherein said electrical connector comprises a plurality of electrical connectors.

18. The aircraft applicable current imbalance detection and circuit interrupter device of claim 17, wherein said electrical connector comprises a first pair of connectors accommodating a first line and load side, a second pair of connectors accommodating a second line and load side, and a third pair of connectors accommodating a third line and load side, and a pair of connectors accommodating the external relay control signal.

19. The aircraft applicable current imbalance detection and circuit interrupter device of claim 8, wherein said housing includes at least one circuit board mounted within the housing for mounting components of the aircraft applicable current imbalance detection and circuit interrupter.

20. The aircraft applicable current imbalance detection and circuit interrupter device of claim 8, wherein the aircraft applicable current imbalance detection and circuit interrupter is configured to test during a power up sequence to determine if the aircraft applicable current imbalance detection and circuit interrupter is operating properly.

21. An aircraft applicable current imbalance detection and circuit interrupter device for interrupting an electrical circuit to an electrical load, the electrical circuit having a line side and a load side, said interrupter comprising:

a housing having electrical connector means for connecting to the electrical circuit line side and load side;

a sensor system disposed in the housing for sensing a current imbalance in the electrical circuit and for providing a sensor signal indicating the existence of a current imbalance within the electrical circuit based on said sensing of said current imbalance;

a logic controller disposed in the housing and configured to receive an external relay control signal and the sensor signal from the sensor system, and to compare the sensor signal with a predetermined range for acceptable operation for the electrical circuit and to interrupt the relay control signal when the sensor signal exceeds said predetermined range;

a power controller configured to be energized by the relay control signal and to remove power to the load side of the electrical circuit when the relay control signal is interrupted, the power controller including a power relay having contacts capable of surviving carry-break and make-carry-break types of ground fault conditions at anticipated current levels;

a fault indicator configured to receive said fault signal from the logic controller, to illuminate indicating a current imbalance condition has occurred; and a reset switch to reset the fault indicator and the current imbalance detection and circuit interrupter.

22. The aircraft applicable current imbalance detection and circuit interrupter device of claim 21 wherein:

the logic controller receives the relay control signal to directly power the power controller;

the relay control signal, depending on the aircraft, may be alternate current (AC) or direct current (DC); and the type of power controller corresponds to the AC or DC relay control signal.

23. The aircraft applicable current imbalance detection and circuit interrupter device of claim 21, wherein the aircraft applicable current imbalance detection and circuit interrupter receives power to operate exclusively from the line side of the electrical circuit being monitored.

* * * * *